United States Patent
Cain, III et al.

(10) Patent No.: US 10,802,971 B2
(45) Date of Patent: Oct. 13, 2020

(54) CACHE MEMORY TRANSACTION SHIELDING VIA PREFETCH SUPPRESSION

(71) Applicant: INTERNATIONAL BUSINESS MACHINES CORPORATION, Armonk, NY (US)

(72) Inventors: Harold W. Cain, III, Raleigh, NC (US); Pratap C. Pattnaik, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/292,740

(22) Filed: Oct. 13, 2016

(65) Prior Publication Data
US 2018/0107505 A1 Apr. 19, 2018

(51) Int. Cl.
| G06F 12/08 | (2016.01) |
| G06F 12/084 | (2016.01) |
| G06F 12/0862 | (2016.01) |
| G06F 12/0815 | (2016.01) |

(52) U.S. Cl.
CPC ........ *G06F 12/084* (2013.01); *G06F 12/0815* (2013.01); *G06F 12/0862* (2013.01); *G06F 2212/1008* (2013.01); *G06F 2212/1024* (2013.01); *G06F 2212/502* (2013.01)

(58) Field of Classification Search
CPC ............. G06F 12/0804; G06F 12/0862; G06F 12/0815; G06F 2212/1008; G06F 2212/502; G06F 2212/1024
See application file for complete search history.

(56) References Cited

U.S. PATENT DOCUMENTS

| 6,397,296 B1 * | 5/2002 | Werner ................. G06F 9/3802 711/119 |
| 8,171,095 B2 | 5/2012 | Hum et al. |
| 8,856,453 B2 | 10/2014 | Dale et al. |
| 8,954,680 B2 | 2/2015 | Peleg |
| 9,235,520 B2 | 1/2016 | Arora et al. |

(Continued)

FOREIGN PATENT DOCUMENTS

JP 11120074 A * 4/1999

OTHER PUBLICATIONS

Disclosed anonymously. (2013). An efficient memory coherency verification engine for SoC. IPCOM000228213D.

(Continued)

*Primary Examiner* — Hiep T Nguyen
(74) *Attorney, Agent, or Firm* — Cantor Colburn LLP; Kurt Goudy (57) ABSTRACT

A computer-implemented method for cache memory management includes receiving a coherence request message from a requesting processor. The method can further include determining a request type responsive to detecting the transactional conflict. The request type is indicative of whether the coherence request is a prefetch request. The method further includes detecting, with a conflict detecting engine, a transactional conflict with the coherence request message. The method further includes sending, with the adaptive prefetch throttling engine, a negative acknowledgement to the requesting processor responsive to a determination that the coherence request is a prefetch request.

20 Claims, 3 Drawing Sheets

(56) References Cited

U.S. PATENT DOCUMENTS

| | | | |
|---|---|---|---|
| 9,372,718 B2 | 6/2016 | Christie et al. | |
| 2003/0217219 A1* | 11/2003 | Sharma | G06F 13/4221 |
| | | | 710/311 |
| 2007/0239940 A1* | 10/2007 | Doshi | G06F 12/0862 |
| | | | 711/137 |
| 2010/0042786 A1* | 2/2010 | Bell | G06F 12/0831 |
| | | | 711/121 |
| 2010/0250853 A1* | 9/2010 | Krieger | G06F 12/1027 |
| | | | 711/122 |
| 2014/0101388 A1* | 4/2014 | McCauley | G06F 12/0862 |
| | | | 711/137 |
| 2014/0164705 A1 | 6/2014 | Corbal et al. | |
| 2016/0110289 A1* | 4/2016 | Hooker | G06F 9/30047 |
| | | | 711/137 |

OTHER PUBLICATIONS

Lee, C. J., Mutlu, O., Narasiman, V., & Patt, Y. N. (2008). Prefetch-aware DRAM controllers. In Proceedings of the 41st annual IEEE/ACM International Symposium on Microarchitecture, 200-209.

Waliullah, M. M., & Stenstrom, P. (2014). Removal of conflicts in hardware transactional memory systems. International Journal of Parallel Programming, 42(1), 198-218.

* cited by examiner

CACHE MEMORY TRANSACTION SHIELDING VIA PREFETCH SUPPRESSION

BACKGROUND

The present disclosure relates to cache memory management, and more specifically, to cache memory transaction shielding via prefetch suppression.

Hardware transactional memory systems provide programmers with a means of annotating a set of operations that will appear to occur atomically with respect to the operation of other threads in the system. Transactional semantics are typically accomplished by tracking the set of memory locations read or written during the transaction. If another thread performs a memory access that conflicts with a location in the transactional read set or transactional write set, then the transaction may be aborted. Two accesses are "conflicting" if they both access the same memory location, and at least one of them is a write access.

SUMMARY

According to one or more embodiments of the present invention, a computer-implemented method for cache memory management is described. The method includes receiving a coherence request message from a requesting processor. The method further includes determining a request type responsive to detecting the transactional conflict. The request type is indicative of whether the coherence request is a prefetch request. The method further includes detecting, with a conflict detecting engine, a transactional conflict with the coherence request message. The method further includes sending, with the adaptive prefetch throttling engine, a negative acknowledgement to the requesting processor responsive to a determination that the coherence request is a prefetch request.

According to one or more embodiments of the present invention, a system for cache memory management is described. The system includes a processor configured to receive a coherence request message from a requesting processor, determine whether the coherence request is a prefetch request, and detect a transactional conflict with the coherence request message. The detection is responsive to determining a transactional conflict. The processor is further configured to send a negative acknowledgement to the requesting processor responsive to a determination that the coherence request is a prefetch request.

According to one or more embodiments, a non-transitory computer-readable storage medium is described. The non-transitory storage medium may include program instructions that are executable by a processor to perform a method for cache memory management. The method includes receiving a coherence request message from a requesting processor. The method further includes determining a request type responsive to detecting the transactional conflict. The request type is indicative of whether the coherence request is a prefetch request. The method further includes detecting, with a conflict detecting engine, a transactional conflict with the coherence request message. The method further includes sending, with the adaptive prefetch throttling engine, a negative acknowledgement to the requesting processor responsive to a determination that the coherence request is a prefetch request.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Hardware transactional memory systems provide programmers with a means of annotating a set of operations that will appear to occur atomically with respect to the operation of other threads in the system. Transactional semantics are typically accomplished by tracking the set of memory locations read or written during the transaction. If another thread performs a memory access that conflicts with a location in the transactional read set or transactional write set, then the transaction may be aborted. Two accesses are "conflicting" if they both access the same memory location, and at least one of them is a write access.

In systems that incorporate caches, prefetch operations are used to preload data into the cache in advance of expected use. Software prefetch operations are initiated explicitly through programmer or compiler inserted instructions executed by the processor. Prefetches can also be initiated automatically by hardware mechanisms that attempt to predict future memory access patterns based on a history of memory accesses. Examples of hardware prefetching mechanisms include sequential prefetchers, stride prefetchers, tag correlating prefetchers, Markov predictor prefetchers, global history buffer prefetchers, cache restoration prefetchers, as well as many others.

Prefetch operations can be categorized into two types: exclusive prefetches and shared prefetches. Exclusive prefetches can be used to preload data in an "exclusive" cache state, which allows the line to be quickly written in the future. Shared prefetches are used to preload data in a read-only state, allowing for subsequent reads of the data to be cache hits. Subsequent writes will pay an additional latency penalty to obtain write permission.

When prefetching mechanisms are used in systems that incorporate transactional memory, prefetch operations may negatively interact with transactions. Given an in-flight transaction executed by one core in the system, prefetch operations that are performed by other cores may be detected as conflicts. For example, an exclusive prefetch to memory location "A" may be detected as a conflict if the transaction has read or written location "A." A shared prefetch may be detected as a conflict or interference if the transaction has written location "A." Interference between memory transactions and prefetch operations in a transactional memory system leads to degradation in terms of aborted transactions even though prefetches are not mandatory actions.

Embodiments described herein provide methods and systems for cache memory management. Some embodiments may provide one or more extensions to a memory coherence protocol so that conflicting prefetches are rejected, which protects the memory transaction. Some embodiments also provide a hardware mechanism to record the conflicts and use that information to filter further conflicting prefetch requests. By preventing conflicts between memory prefetches, computing system functionality is improved by reducing system latency and prevention of system crashes.

Figure 1:
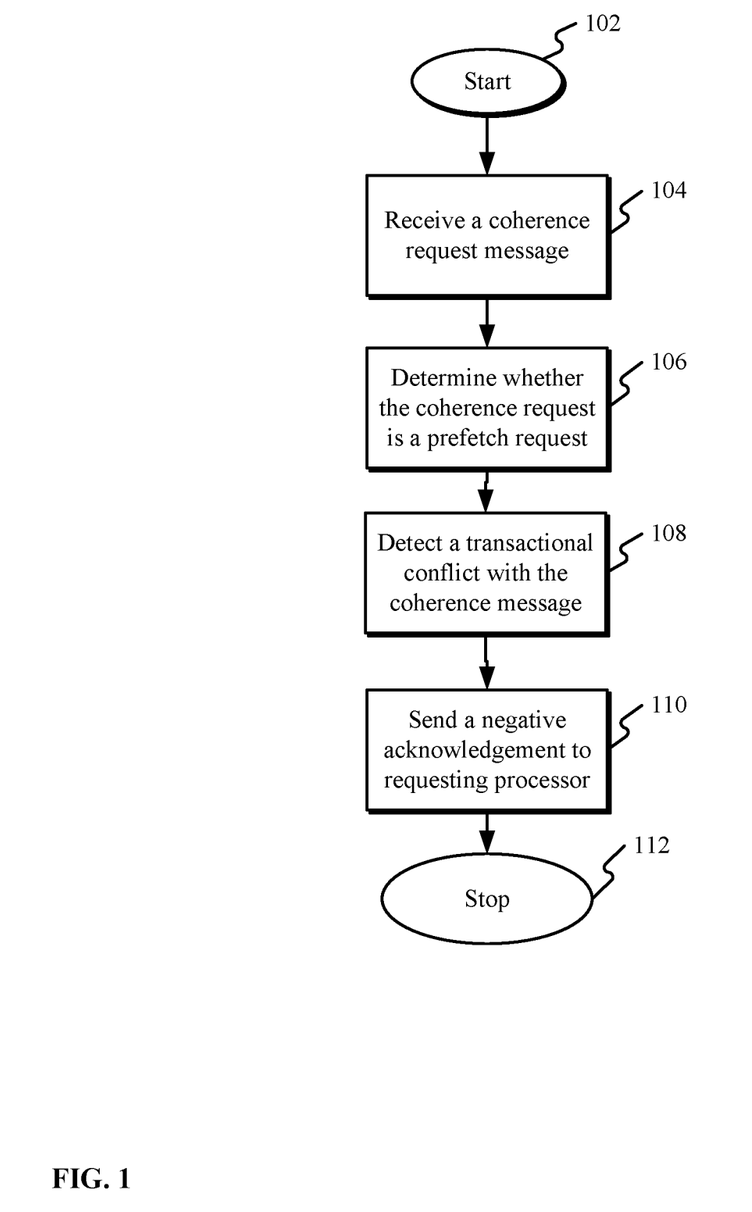
FIG. 1 depicts a flow diagram of a computer-implemented method for cache memory management according to one embodiment.

FIG. 1 depicts a flow chart of a computer-implemented method for cache memory management, according to a non-limiting embodiment. Referring now to FIG. 1, after an initial start step 102, a system processor (e.g., processor 301 as depicted with respect to FIG. 3), may receive a coherence request message from an issuing processor, as shown in block 104. According to one embodiment, a conflict detection engine (e.g., coherence detection engine 314 as shown in FIG. 3) is configured to receive coherence requests from an issuing processor, and determine that the request is a prefetch request or a demand request.

Figure 3:
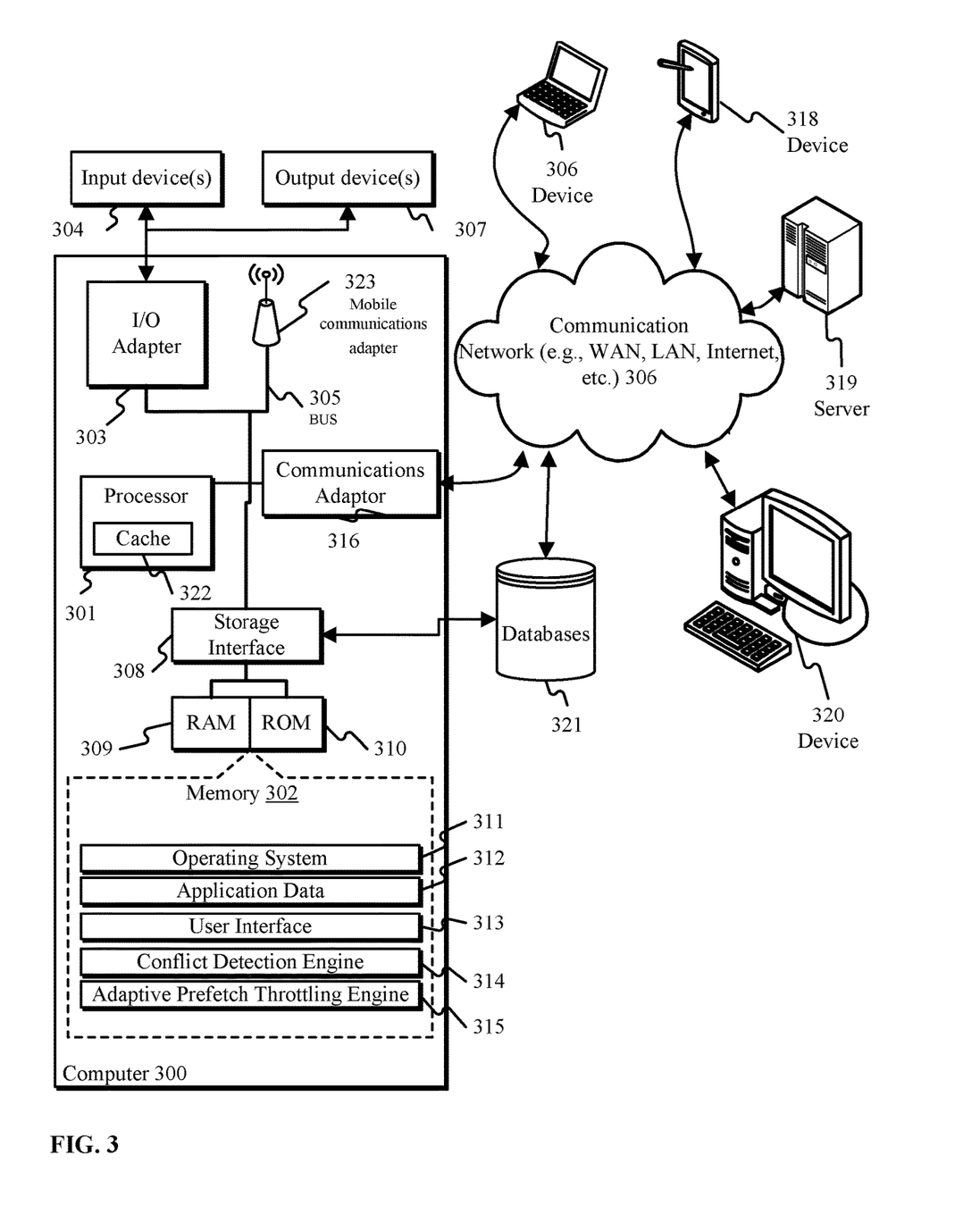
FIG. 3 depicts a block diagram of a computer system for use in practicing the teachings herein.

Prefetch requests cause data from the memory subsystem (e.g., memory 302 as depicted in FIG. 3) to be fetched or retrieved into L1 cache (e.g., cache 322 in FIG. 3) and/or L2 cache preferably before the data is needed by processor 301. The concept of prefetching recognizes that data accesses frequently exhibit spatial locality. Spatial locality suggests that the address of the next memory reference is likely to be near the address of recent memory references. A common manifestation of spatial locality is a sequential data stream, in which data from a block of memory is accessed in a monotonically increasing (or decreasing) sequence such that contiguous cache lines are referenced by at least one instruction.

Figure 2:
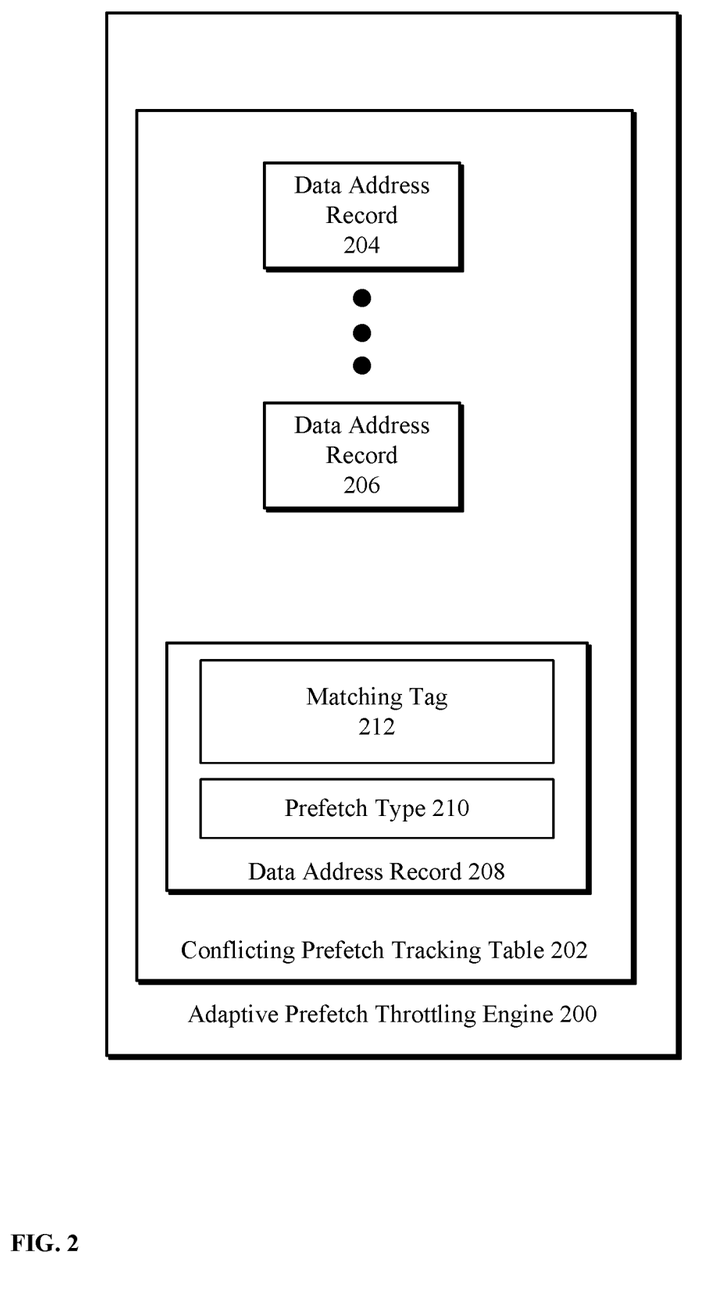
FIG. 2 depicts a diagram of a prefetch throttling engine according to one embodiment.

As shown in block 106, processor 301 may determine a request type if processor 301 detects the transactional conflict. The request type is indicative of whether the coherence request is a prefetch request. Processor 301 may determine the request type with an adaptive prefetch throttling engine. FIG. 2 depicts an exemplary prefetch throttling engine 200, according to one embodiment.

Referring briefly to FIG. 2, adaptive prefetch throttling engine 200 (hereafter "engine 200") is depicted. In some aspects, engine 200 may include one or more conflicting prefetch tracking tables 202 (hereafter "tracking table 202"). Tracking table 202 may include a plurality of data address records (e.g., data address record 204, 206, 208, etc.). For example, data address record 208 includes information that includes prefetch type 210 and matching tag information 212. Coherence request messages include an additional bit of information, depicted in FIG. 2 as prefetch type 210. Prefetch type 210 is used to determine whether the request being sent is either a demand request or a prefetch request.

The prefetch throttling engine 200 includes a plurality of tables called the Conflicting Prefetch Tracking Tables (CPTT). Each CPTT is associated with a processor core, which contains a set of data address records that processor 301 uses to filter prefetch requests. One example of a CPTT is prefetch tracking table 202, as depicted in FIG. 2.

As shown in FIG. 2, data address record 208 includes a matching tag 212 that is used to match prefetch addresses, and information indicative of a prefetch type 210 that includes a bit indicating the prefetch type to be filtered. For example, data address record 208 may include a prefetch type 210 having a value 0 that indicates all prefetches are to be filtered. In other aspects, prefetch type 210 may save a value 1 indicative that only exclusive prefetches are to be filtered. In other embodiments, processor 301 may filter all prefetches or filter no prefetches without regard to the prefetch type. Although only three data address records are shown in engine 200, it is contemplated that tracking table 202 may include any number of records.

Referring again to FIG. 1, after determining whether the coherence request is a prefetch request in block 106, as shown in block 110, processor 301 may detect a transactional conflict with the coherence message. For example, if processor 301 detects a transactional conflict with a request, if prefetch type 210 indicates that the request corresponds to a prefetch operation, processor 301 may send a negative acknowledgement response to the requesting processor, as shown in block 110. If the prefetch type 210 indicates that the request corresponds to a demand operation, then the conflict resolution protocol operates as usual.

For each prefetch request initiated by a hardware or software prefetch mechanism (e.g., conflict detection engine 314), tracking table 202 is indexed using a plurality of bits from the data address of the prefetch request. If an entry does not exist in tracking table 202 for this address, then the prefetch request is allowed to proceed (that is, the transaction is permitted by processor 301 to complete). If an entry exists corresponding to this address, and the bit (matching tag 212) contained in this entry is 0, then the prefetch request is dropped. If an entry exists and the bit stored in prefetch type 210 is 1, then the prefetch request is allowed to occur as a shared prefetch. Stated in another way, if the prefetch is already a shared prefetch, as indicated in prefetch type 210, then the transaction is allowed to proceed. But if the transaction is an exclusive prefetch, as indicated by prefetch type 210, it is converted to a shared prefetch.

Entries in the tracking table 202 are allocated at the detection of a transactional conflict due to a prefetch request by the associated core. The conflicting prefetch request may or may not cause a transaction to be aborted, in a preferred embodiment it would not. On detection of the conflict, processor 301 returns a response to the originating core indicating that the prefetch was conflicting. If the prefetch was a shared prefetch, and the prefetch was conflicting, then processor 301 may allocate a data address record in tracking table 202 (and more particularly, prefetch type 210), where the associated bit in matching tag 212 is set to 0. If the prefetch was an exclusive prefetch, and the response indicates that the prefetch was conflicting with a transactional store, then data address record 201 is allocated using a cache memory least recently used (LRU) policy.

FIG. 3 illustrates a block diagram of an exemplary computing environment and computer system 300 (hereafter "computer 300") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 300 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 3, the computer 300 includes processor 301. Computer 300 also includes memory 302 coupled to processor 301, and one or more input/output adapters 303 that may be communicatively coupled via system bus 305. Memory 302 may be operatively coupled to one or more internal or external memory devices via a storage interface 308. Communications adapter 316 may be operatively connect computer 300 to one or more networks 306. System bus 305 may connect one or more user interfaces via input/output (I/O) adapter 303. I/O adapter 303 may connect a plurality of input devices 304 to computer 300. Input devices may include, for example, a keyboard, a mouse, a microphone, a sensor, etc. System bus 305 may also connect one or more output devices 307 via I/O adapter 303. Output device 307 may include, for example, a display, a speaker, a touchscreen, etc.

Processor 301 is a hardware device for executing hardware instructions or software, particularly that stored in a non-transitory computer-readable memory (e.g., memory 302). Processor 301 can be any custom made or commercially available processor, a central processing unit (CPU), a plurality of CPUs, for example, CPU 301a-301c, an auxiliary processor among several other processors associated with the computer 300, a semiconductor based microprocessor (in the form of a microchip or chip set), or generally any device for executing instructions. Processor 301 can include a cache memory 322, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 322 may be organized as a hierarchy of more cache levels (L1, L2, etc.).

Processor 301 may be disposed in communication with one or more memory devices (e.g., RAM 309, ROM 310, one or more external databases 321, etc.) via a storage interface 308. Storage interface 308 may also connect to one or more memory devices including, without limitation, one or more databases 321, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, one or more conflicting prefetch tracking tables.

Memory 302 can include random access memory (RAM) 309 and read only memory (ROM) 310. RAM 309 can be any one or combination of volatile memory elements (e.g., DRAM, SRAM, SDRAM, etc.). ROM 310 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 302 may incorporate electronic, magnetic, optical, and/or other types of non-transitory computer-readable storage media. Memory 302 may also be a distributed architecture, where various components are situated remote from one another, but can be accessed by processor 301.

The instructions in memory 302 may include one or more separate programs, each of which comprises an ordered listing of computer-executable instructions for implementing logical functions. In the example of FIG. 3, the instructions in memory 302 may include an operating system 311. Operating system 311 can control the execution of other computer programs and provides scheduling, input-output control, file and data management, memory management, and communication control and related services.

The instructions in memory 302 may further include application data 312, and a user interface 313. Memory 302 may also include conflict detection engine 314, configured to detect a transactional conflict with the coherence request message.

Memory 302 may further include an adaptive prefetch throttling engine, which may be configured to determine, responsive to detecting the transactional conflict, whether the coherence request is a prefetch request; and send a negative acknowledgement to the requesting processor responsive to a determination that the coherence request is a prefetch request, and update a conflicting prefetch tracking table that includes a plurality of data address records to record transactional conflicts and associate each transactional conflict with a data address.

I/O adapter 303 can be, for example but not limited to, one or more buses or other wired or wireless connections. I/O adapter 303 may have additional elements (which are omitted for simplicity) such as controllers, microprocessors, buffers (caches), drivers, repeaters, and receivers, which may work in concert to enable communications. Further, I/O adapter 303 may facilitate address, control, and/or data connections to enable appropriate communications among the aforementioned components.

I/O adapter 303 can further include a display adapter coupled to one or more displays. I/O adapter 303 may be configured to operatively connect one or more input/output (I/O) devices 307 to computer 300. For example, I/O 303 may connect a keyboard and mouse, a touchscreen, a speaker, a haptic output device, or other output device. Output devices 307 may include but are not limited to a printer, a scanner, and/or the like. Other output devices may also be included, although not shown. Finally, the I/O devices connectable to I/O adapter 303 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 300 may include a mobile communications adapter 323. Mobile communications adapter 323 may include GPS, cellular, mobile, and/or other communications protocols for wireless communication.

In some embodiments, computer 300 can further include communications adapter 316 for coupling to a network 306.

Network 306 can be an IP-based network for communication between computer 300 and any external device. Network 306 transmits and receives data between computer 300 and devices and/or systems external to computer 300. In an exemplary embodiment, network 306 can be a managed IP network administered by a service provider. Network 306 may be a network internal to an aircraft, such as, for example, an avionics network, etc. Network 306 may be implemented in a wireless fashion, e.g., using wireless protocols and technologies, such as WiFi, WiMax, etc. Network 306 may also be a wired network, e.g., an Ethernet network, an ARINC 429 network, a controller area network (CAN), etc., having any wired connectivity including, e.g., an RS232 connection, R5422 connection, etc. Network 306 can also be a packet-switched network such as a local area network, wide area network, metropolitan area network, Internet network, or other similar type of network environment. The network 306 may be a fixed wireless network, a wireless local area network (LAN), a wireless wide area network (WAN) a personal area network (PAN), a virtual private network (VPN), intranet or other suitable network system.

Network 306 may operatively connect computer 300 to one or more devices including device 317, device 318, and device 320. Network 306 may also connect computer 300 to one or more servers such as, for example, server 319.

If computer 300 is a PC, workstation, laptop, tablet computer and/or the like, the instructions in the memory 302 may further include a basic input output system (BIOS) (omitted for simplicity). The BIOS is a set of essential routines that initialize and test hardware at startup, start operating system 311, and support the transfer of data among the operatively connected hardware devices. The BIOS is stored in ROM 310 so that the BIOS can be executed when computer 300 is activated. When computer 300 is in operation, processor 301 may be configured to execute instructions stored within the memory 302, to communicate data to and from the memory 302, and to generally control operations of the computer 300 pursuant to the instructions.

Some embodiments described herein provide one or more extensions to a memory coherence protocol so that conflicting prefetches are rejected by processor 301, which protects the memory transaction. By preventing conflicts between memory prefetches, computing system functionality (e.g., that of exemplary computing system 300) is improved by reducing system latency and prevention of system crashes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cache memory management comprising a conflict detection engine configured for:
    receiving a coherence request message from a requesting processor;
    determining a request type responsive to detecting a transactional conflict, wherein the request type is indicative of whether the coherence request message is a prefetch request, wherein determining comprises filtering, via a set of data address records in which each data address record includes a matching tag in an adaptive prefetch throttling engine, received conflicting prefetch requests;
    selecting a prefetch request type between different prefetch request types based on the matching tag associated with each data address record of the set of data address records in the adaptive prefetch throttling engine;
    detecting, via a conflict detecting engine, a transactional conflict with the coherence request message based on the request type;
    sending, via the adaptive prefetch throttling engine, a negative acknowledgement to the requesting processor responsive to a determination that the coherence request is a prefetch request; and
    responsive to the prefetch request type indicating an exclusive prefetch, converting the exclusive prefetch to a shared prefetch;
    wherein the matching tag includes a bit indicating a filtering policy for filtering among different prefetch request types.

2. The computer-implemented method of claim 1, wherein the coherence request message comprises a coherence request and an identifier that identifies the coherence request as one of a demand request and a prefetch request.

3. The computer-implemented method of claim 1, further comprising:
    updating a conflicting prefetch tracking table comprising a plurality of data address records to record transactional conflicts and associate each transactional conflict with a data address.

4. The computer-implemented method of claim 3, wherein updating the conflicting prefetch tracking table comprises:
    updating a data address record with information indicative of a prefetch address; and
    updating the address record with information of a prefetch type, wherein the type comprises one of an exclusive prefetch or a shared prefetch.

5. The computer-implemented method of claim 4, wherein updating the conflicting prefetch tracking table comprises:
    filtering all prefetches or filtering no prefetches without regard to the prefetch type.

6. The computer-implemented method of claim 1, wherein detecting the transactional conflict with the coherence request message comprises detecting the transactional conflict without using an adaptive prefetch throttling mechanism.

7. The computer-implemented method of claim 1, wherein the matching tag is used to match prefetch addresses and information indicative of a prefetch type.

8. The computer-implemented method of claim 1, wherein the matching tag includes a bit indicating the prefetch type to be filtered.

9. A system for cache memory management comprising a processor configured to:
    receive a coherence request message from a requesting processor;
    determine, responsive to detecting a transactional conflict, a request type, wherein the request type is indicative of whether the coherence request message is a prefetch request, wherein determining comprises filtering, via a set of data address records in which each data address record includes a matching tag in an adaptive prefetch throttling engine, received conflicting prefetch requests;
    selecting a prefetch request type between different prefetch request types based on the matching tag associated with each data address record of the set of data address records in the adaptive throttling engine;
    detect a transactional conflict with the coherence request message;
    send a negative acknowledgement to the requesting processor responsive to a determination that the coherence request is a prefetch request; and
    responsive to the prefetch request type indicating an exclusive prefetch, converting the exclusive prefetch to a shared prefetch;
    wherein the matching tag includes a bit indicating a filtering policy for filtering among different prefetch request types.

10. The system of claim 9, wherein the coherence request message comprises a coherence request and an identifier that identifies the coherence request as one of a demand request and a prefetch request.

11. The system of claim 9 further comprising:
    updating, via an adaptive prefetch throttling engine, a conflicting prefetch tracking table comprising a plurality of data address records to record transactional conflicts and associate each transactional conflict with a data address.

12. The system of claim 11, wherein the processor is configured to:
   update a data address record with information indicative of a prefetch address; and
   update the address record with information of a prefetch type, wherein the type comprises one of an exclusive prefetch or a shared prefetch.

13. The system of claim 12, wherein the processor is configured to:
   filter all prefetches or filtering no prefetches without regard to the prefetch type.

14. The system of claim 9, wherein the processor is configured to detect the transactional conflict without using an adaptive prefetch throttling mechanism.

15. The system of claim 9, wherein the matching tag is used to match prefetch addresses and information indicative of a prefetch type.

16. A computer program product for cache memory management, the computer program product comprising a computer readable storage medium having program instructions embodied therewith, the program instructions executable by a processor to cause the processor to perform a method comprising:
   receiving, via a processor, a coherence request message from a requesting processor;
   determining a request type responsive to detecting a transactional conflict, wherein the request type is indicative of whether the coherence request message is a prefetch request, wherein determining comprises filtering, via a set of data address records in which each data address record includes a matching tag in an adaptive prefetch throttling engine, received conflicting prefetch requests;
   selecting a prefetch request type between different prefetch request types based on the matching tag associated with each data address record of the set of data address records in the adaptive prefetch throttling engine;
   detecting, via a conflict detecting engine, a transactional conflict with the coherence request message; and
   sending, via the adaptive prefetch throttling engine, a negative acknowledgement to the requesting processor responsive to a determination that the coherence request is a prefetch request; and
   responsive to the prefetch request type indicating an exclusive prefetch, converting the exclusive prefetch to a shared prefetch;
   wherein the matching tag includes a bit indicating a filtering policy for filtering among different prefetch request types.

17. The computer program product of claim 16, wherein the coherence request message comprises a coherence request and an identifier that identifies the coherence request as one of a demand request and a prefetch request.

18. The computer program product of claim 16, further comprising:
   updating a conflicting prefetch tracking table comprising a plurality of data address records to record transactional conflicts and associate each transactional conflict with a data address.

19. The computer program product of claim 18, wherein updating the conflicting prefetch tracking table comprises:
   updating a data address record with information indicative of a prefetch address; and
   updating the address record with information of a prefetch type, wherein the type comprises one of an exclusive prefetch or a shared prefetch.

20. The computer program product of claim 19, wherein updating the conflicting prefetch tracking table comprises:
   filtering all prefetches or filtering no prefetches without regard to the prefetch type.

* * * * *